(12) United States Patent
Satoh

(10) Patent No.: US 7,671,906 B2
(45) Date of Patent: Mar. 2, 2010

(54) IMAGE TRANSFER SYSTEM AND METHOD THEREFOR, IMAGE TRANSMISSION APPARATUS, AND IMAGE RECEPTION APPARATUS

(75) Inventor: Makoto Satoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 11/555,057

(22) Filed: Oct. 31, 2006

(65) Prior Publication Data

US 2007/0070414 A1 Mar. 29, 2007

Related U.S. Application Data

(62) Division of application No. 09/271,247, filed on Mar. 17, 1999, now Pat. No. 7,148,915.

(30) Foreign Application Priority Data

| Mar. 20, 1998 | (JP) | ................................. | 10-071952 |
| Mar. 12, 1999 | (JP) | ................................. | 11-065874 |

(51) Int. Cl.
| H04N 5/76 | (2006.01) |
| H04N 5/225 | (2006.01) |
| H04N 5/222 | (2006.01) |

(52) U.S. Cl. ............................ 348/231.99; 348/207.99; 348/333.01

(58) Field of Classification Search ....................... None
See application file for complete search history.

(56) References Cited

U.S. PATENT DOCUMENTS

| 4,672,460 | A | 6/1987 | Tsuda | .......................... | 358/257 |
| 5,220,439 | A | 6/1993 | Yoshida | ........................ | 358/404 |
| 5,432,871 | A | 7/1995 | Novik | .......................... | 382/232 |
| 5,455,687 | A | 10/1995 | Fukui et al. | .................. | 358/438 |
| 5,473,370 | A | 12/1995 | Moronaga et al. | ............ | 348/231 |
| 5,648,816 | A | 7/1997 | Wakui | ...................... | 348/231.9 |
| 5,805,215 | A | 9/1998 | Mizoguchi | ............... | 348/231.5 |
| 6,111,662 | A | * 8/2000 | Satoh et al. | .................. | 358/442 |
| 6,188,431 | B1 | 2/2001 | Oie | ........................ | 348/333.05 |
| 6,204,877 | B1 | 3/2001 | Kiyokawa | ................. | 348/211.3 |
| 6,282,362 | B1 | 8/2001 | Murphy | .................... | 358/909.1 |

(Continued)

FOREIGN PATENT DOCUMENTS

JP 03-143084 6/1991

(Continued)

OTHER PUBLICATIONS

European Office Action dated Nov. 26, 2007 issued in Application No. 99302128.6-2202.

*Primary Examiner*—Justin P Misleh
(74) *Attorney, Agent, or Firm*—Fitzpatrick, Cella, Harper & Scinto

(57) ABSTRACT

An image transmission apparatus transfers to an external apparatus data amount information indicating an amount of target image data and information of a priority order of the target image data. The apparatus also receives from the external apparatus a response signal indicating whether the external apparatus will accept transmission of the target image data in accordance with the data amount information, the information of priority order, and a free storage capacity to store the target image data in the external apparatus. Transmission of the target image data is controlled in accordance with the response signal.

8 Claims, 13 Drawing Sheets

U.S. PATENT DOCUMENTS

| | | | |
|---|---|---|---|
| 6,507,371 B1 | 1/2003 | Hashimoto | 348/552 |
| 6,515,697 B1 | 2/2003 | Yamada | 348/231.6 |
| 6,522,354 B1 | 2/2003 | Kawamura et al. | 348/231.2 |
| 6,535,243 B1 | 3/2003 | Tullis | 348/207.1 |
| 2002/0191096 A1 | 12/2002 | Tanaka | 348/231.3 |
| 2007/0252901 A1* | 11/2007 | Yokonuma et al. | 348/231.1 |

FOREIGN PATENT DOCUMENTS

| | | |
|---|---|---|
| JP | 06-046221 | 2/1994 |
| JP | 7-312661 | 11/1995 |
| JP | 8-237490 | 9/1996 |

* cited by examiner

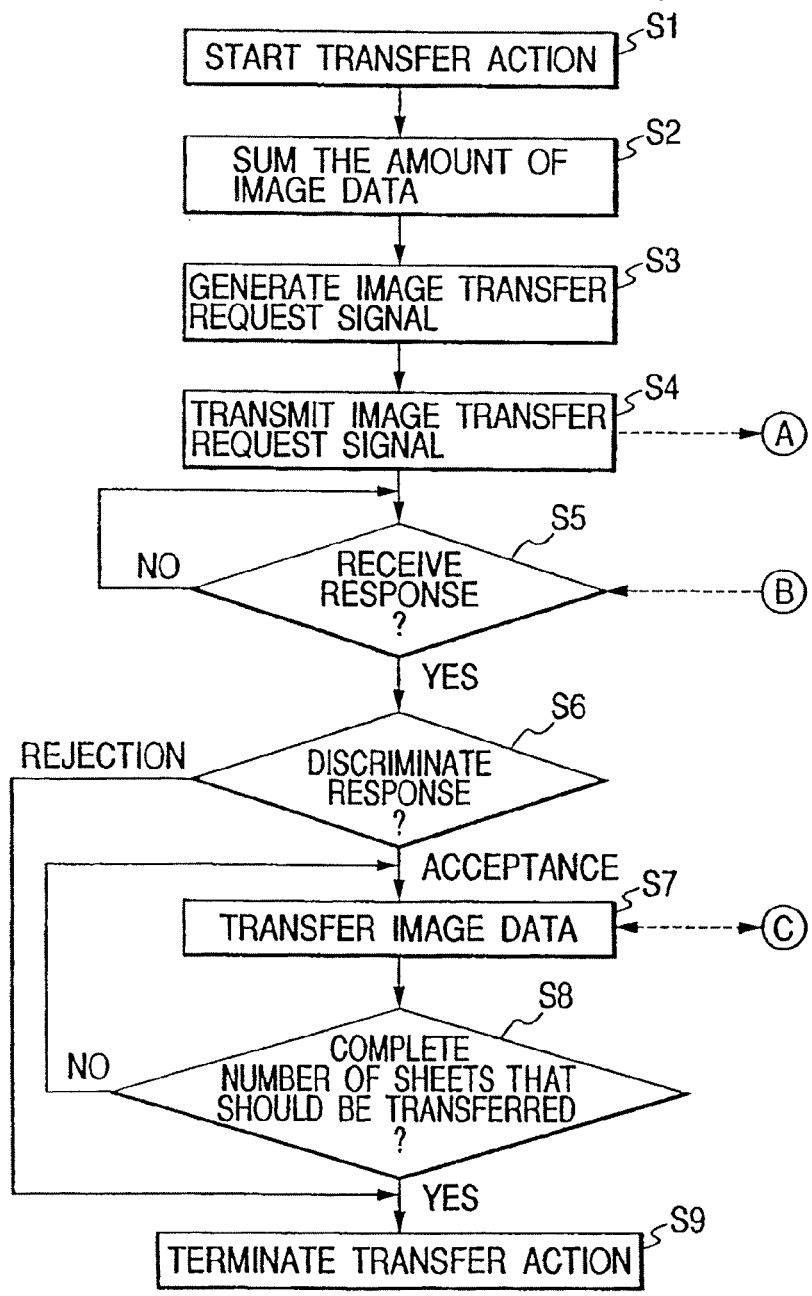

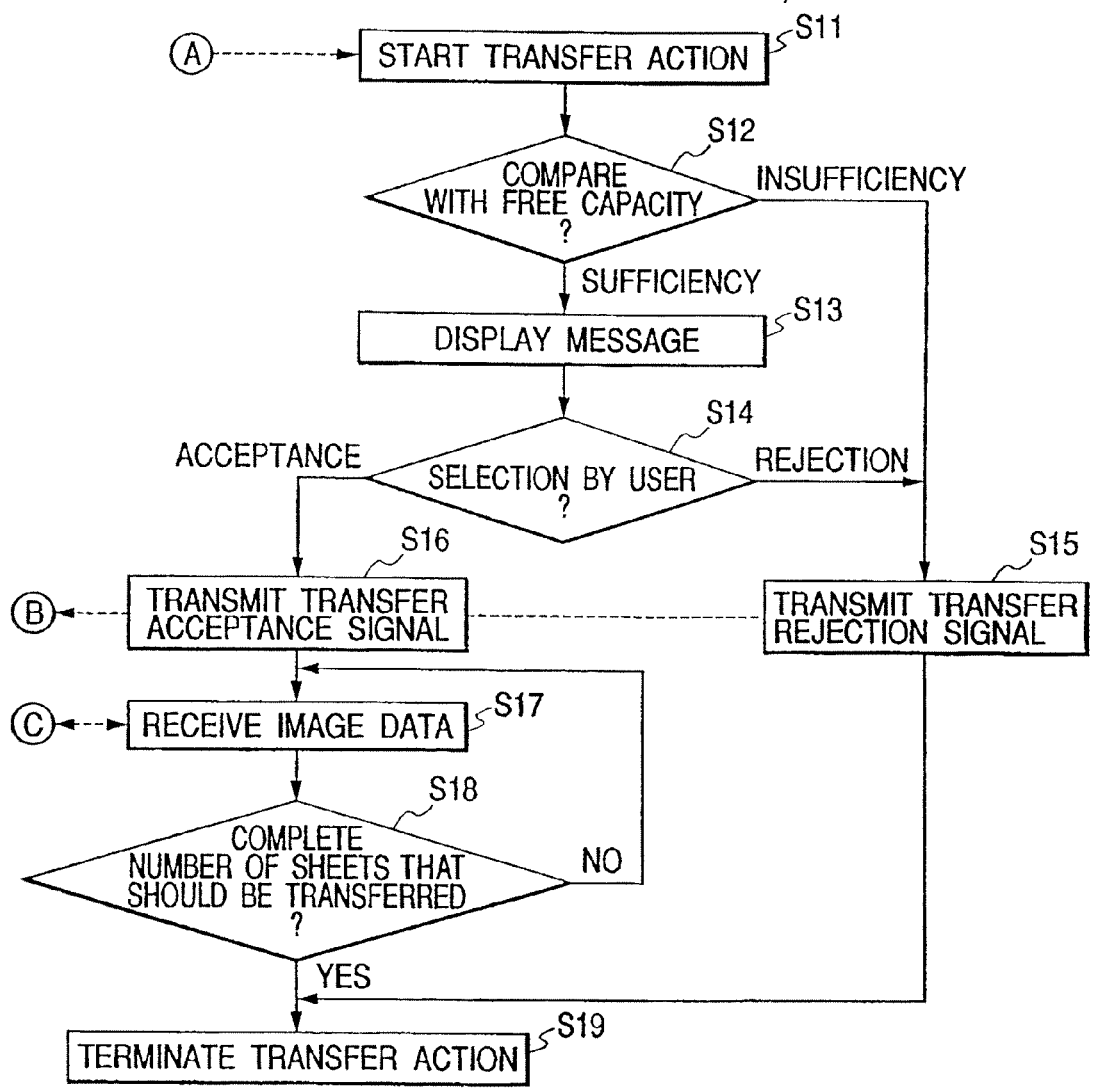

CALL ORIGINATION SIDE APPARATUS
(IMAGE TRANSMISSION APPARATUS)

| FIG. 5A | FIG. 5B |

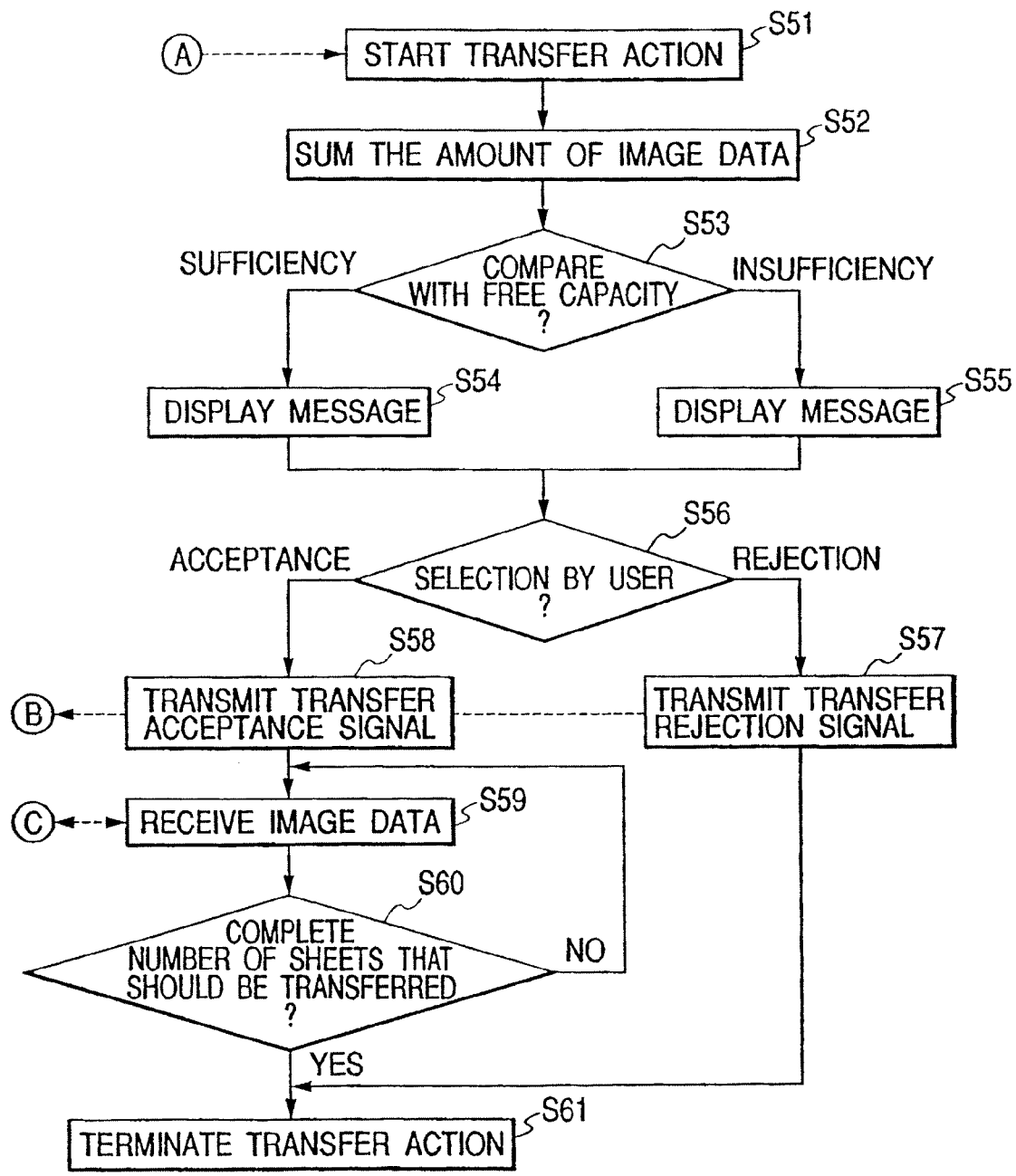

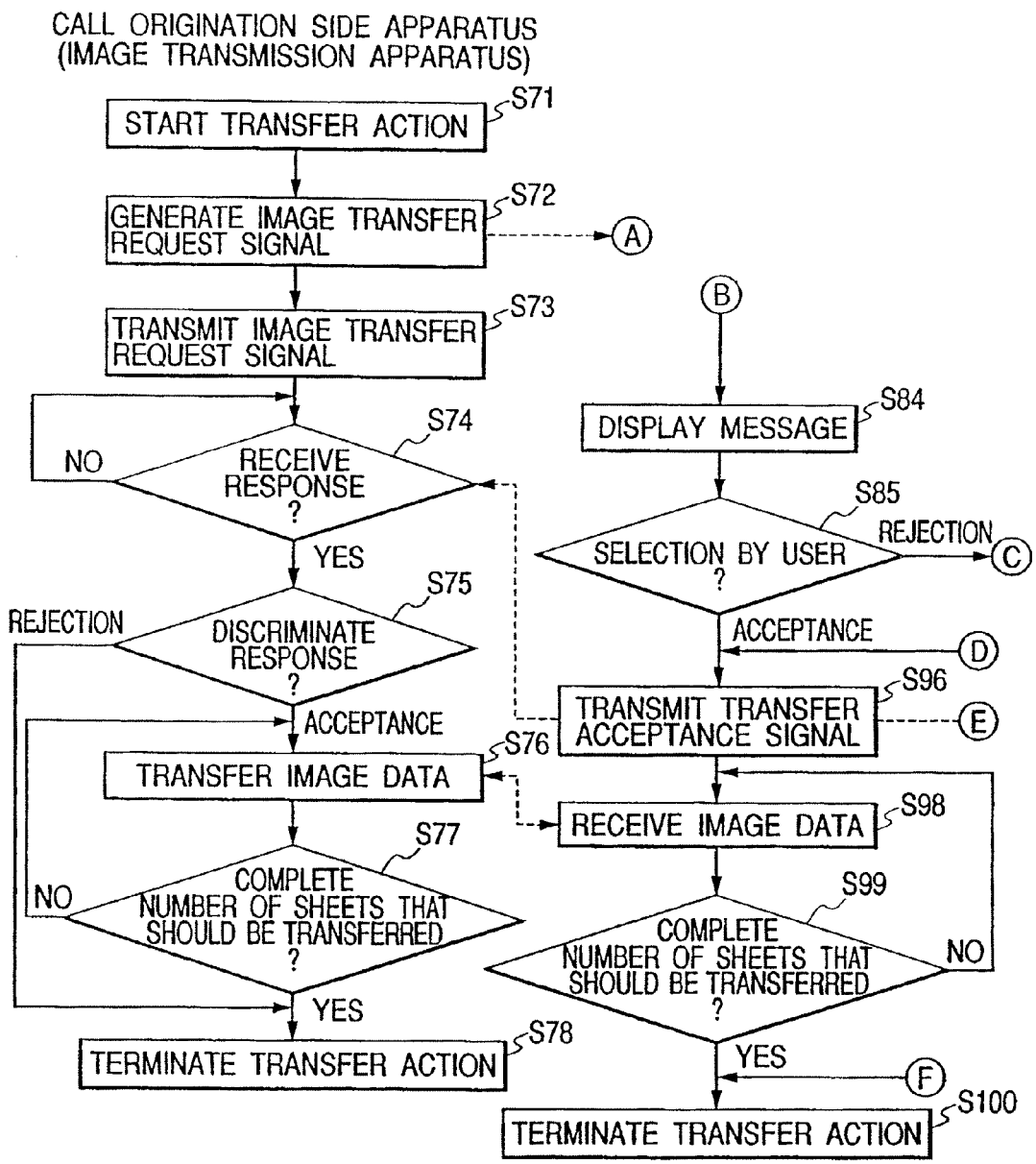

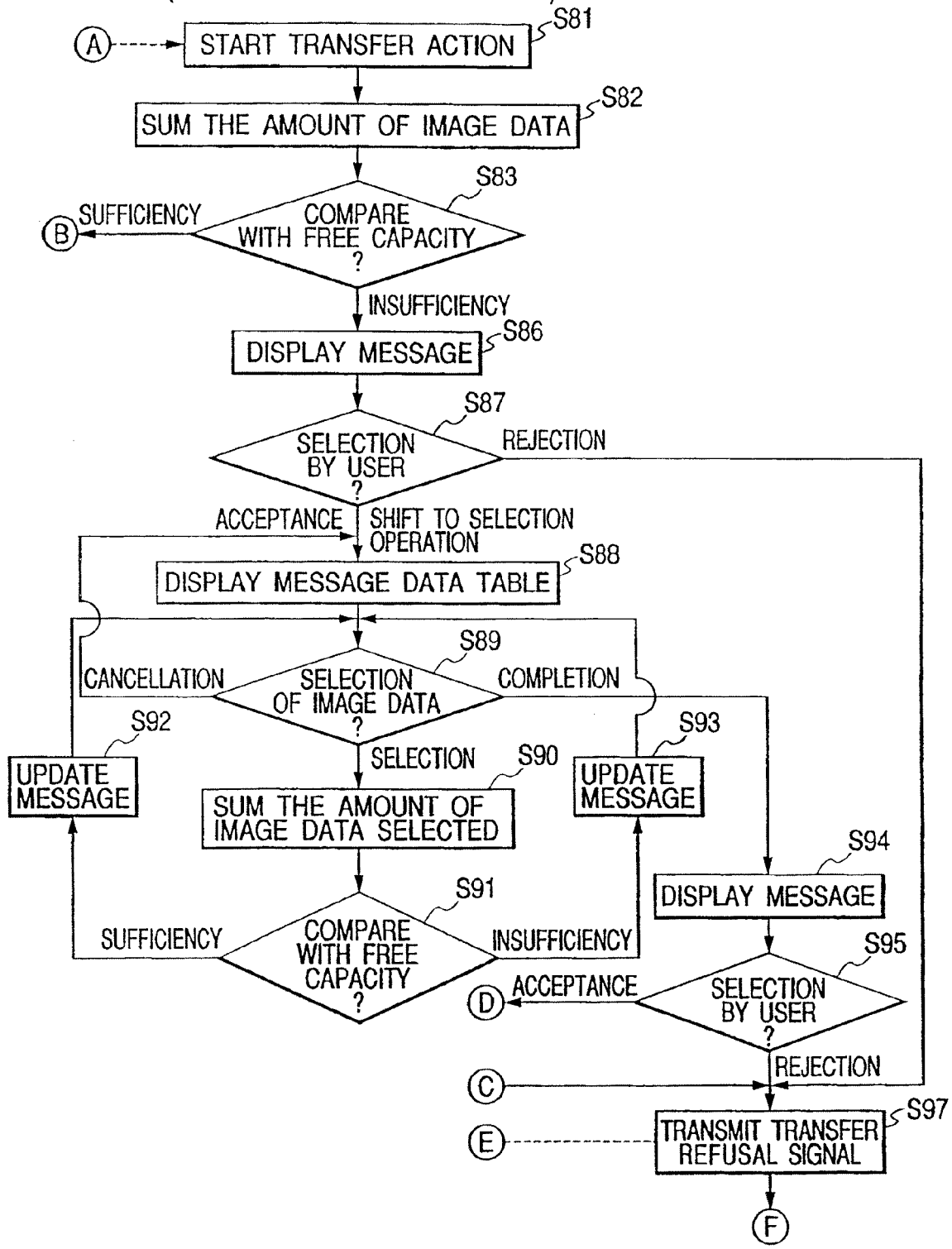

FIG. 8

UNDER IMAGE TRANSFER RECEPTION

120                                        10    0

☐ THE PRESENT POSSIBLE NUMBER OF
  SHEETS FOR PHOTOGRAPHING : 10
☐ THE NUMBER OF
  SHEETS THAT SHOULD BE TRANSFERRED : 12
☐ THE POSSIBLE NUMBER OF SHEETS
  FOR PHOTOGRAPHING AFTER TRANSFER : −2

SELECT IMAGE SHOULD BE TRANSFERRED ?

( YES )    ( NO )

FIG. 9

UNDER TRANSFER IMAGE SELECTION

☐ SELECT IMAGE THAT SHOULD BE TRANSFERRED

| 1. PIC00001.JPG Jan. 30. 1999 |
| 2. PIC00003.JPG Jan. 30. 1999 |
| 3. PIC00006.JPG Feb. 06. 1999 |
| 4. PIC00007.JPG Feb. 06. 1999 |
| 5. PIC00009.JPG Feb. 08. 1999 |
| 6. PIC00010.JPG Feb. 08. 1999 |

TERMINATE SELECTION OPERATION ?

( YES )    ( CANCELLATION )

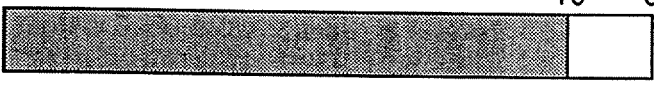

IMAGE TRANSFER SYSTEM AND METHOD THEREFOR, IMAGE TRANSMISSION APPARATUS, AND IMAGE RECEPTION APPARATUS

This application is a division of application Ser. No. 09/271,247 filed Mar. 17, 1999 now U.S. Pat. No. 7,148,915.

BACKGROUND OF THE INVENTION

1. Field of the Invention

The present invention relates to an image transfer system and a method therefor, and an image transmission apparatus and an image reception apparatus.

2. Related Background Art

In recent years, many kinds of digital camera apparatuses have been developed and put on the market. Further, there have been proposed apparatuses provided with a data communication function for the purpose of transferring photographed image data (image files). For most of them, however, consideration has been given only to data transfer between a digital camera apparatus and a file server; consideration has not been given to image transfer between digital camera apparatuses.

The image data storage medium used for many kinds of digital camera apparatuses is a non-volatile semiconductor memory. For some of them, there is adopted a mode of detachable memory card.

However, irrespective of the modes currently available for the operation of image data transfer, it is impossible to receive and store the sheet number of photographed images having a data amount that may exceed the currently available free storage of an image storage medium which is a semiconductor memory whose capacity is limited. In this case, therefore, the transfer operation should terminate promptly or there is a need for operating the transfer within a limit of the transferable sheet number of image data.

Also, even when there may be some room for the storage capacity, it is necessary to let the operator of the apparatus on the reception side determine whether he accepts or he should refuse the image transfer in accordance with a notification of the capacity requirement of an image storage medium if its availability will become extremely small after completion of the transfer operation of target image data.

SUMMARY OF THE INVENTION

The present invention is designed in consideration of the problems encountered in the conventional apparatus which have been discussed above. It is an object of the invention to provide an image transfer system which improves operativity of image transfer for an image reception apparatus whose image storage capacity is limited, and a method therefor, as well as to provide an image transmission apparatus and an image reception apparatus.

It is another object of the invention to provide an image transfer system which makes it possible to promptly terminate a transfer operation of image data which may exceed the free (unused) storage capacity of the image storage medium of the image reception apparatus, and also, to let the operator of the apparatus on the reception side determine whether or not he should proceed with a transfer operation using the apparatus on the reception side, and also to provide a method therefor, as well as an image transfer apparatus and an image reception apparatus.

It is still another object of the invention to provide an image transfer system having new functions, and a method therefor, as well as to provide an image transmission apparatus and an image reception apparatus.

Other objectives and advantages besides those discussed above will be apparent to those skilled in the art from the description of the preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is comprised of FIG. 2A and FIG. 2B showing flowcharts which show the image transfer in accordance with the first embodiment of the present invention.

FIG. 7 is comprised of FIG. 7A and FIG. 7B showing flowcharts which show the image transfer in accordance with a fourth embodiment of the present invention.

FIG. 8 is a view which shows another example of the message appearing on the apparatus on the called (incoming call) side (the image reception apparatus).

FIG. 9 is a view which shows still another example of the message appearing on the apparatus on the called (incoming call) side (the image reception apparatus).

FIG. 12 is a view which shows another example of the message appearing on the apparatus on the called (incoming call) side (the image reception apparatus).

FIG. 13 is a view which shows still another example of the message appearing on the apparatus on the called (incoming call) side (the image reception apparatus).

DETAILED DESCRIPTION OF THE PREFERRED EMBODIMENTS

Hereinafter, with reference to the accompanying drawings, a detailed description will be made of the embodiments in accordance with the present invention.

Figure 1:
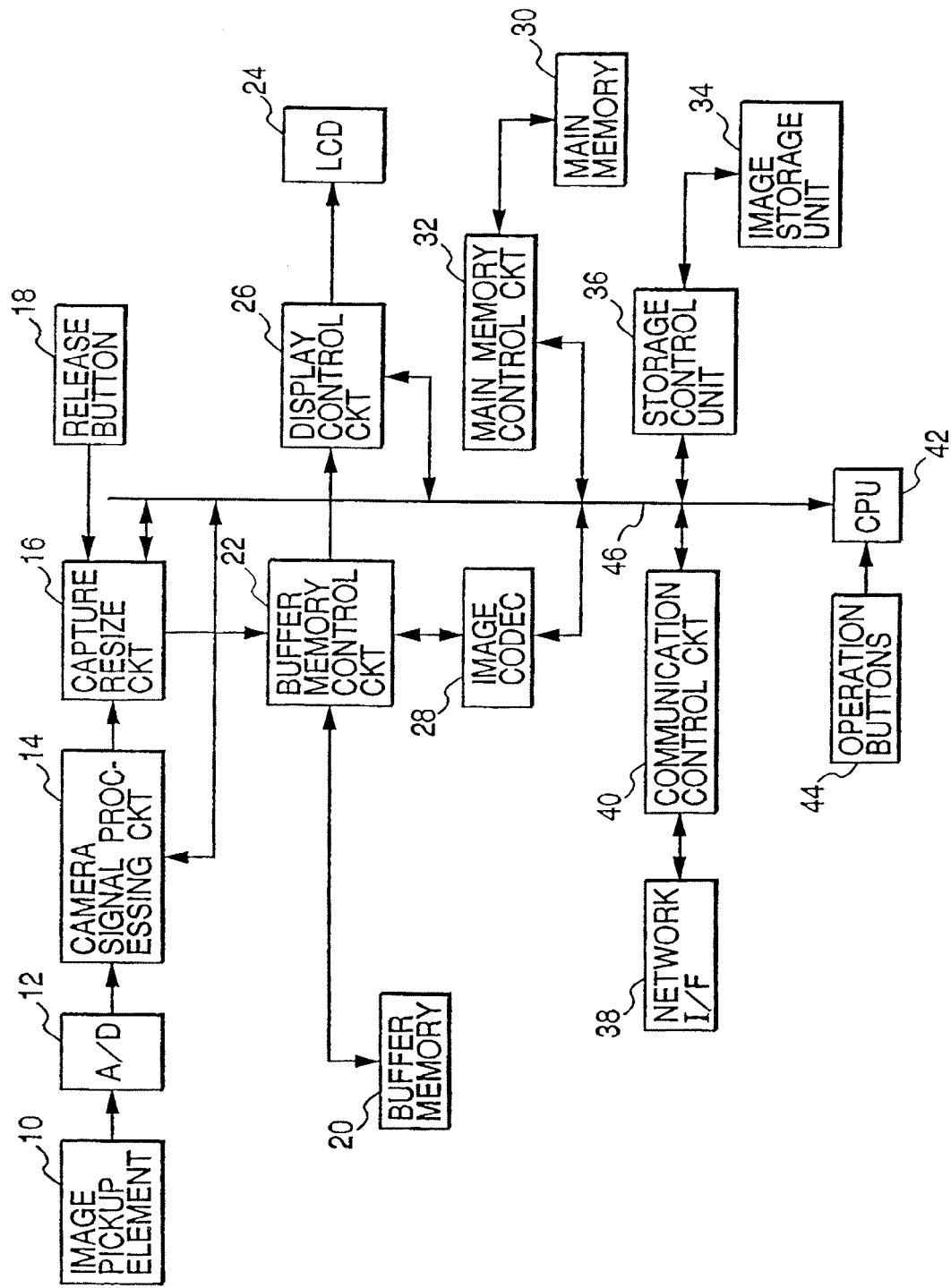
FIG. 1 is a block diagram which schematically shows the structure of a digital camera in accordance with a first embodiment of the present invention.

FIG. 1 is a block diagram which schematically shows a portable digital camera in accordance with a first embodiment of the present invention. As shown in FIG. 1, the portable camera includes an image pickup element 10; an A/D converter 12 that converts analogue image signals output from the image pickup element into digital signals; a camera signal processing circuit 14, formed by a DSP (digital signal processor), that executes a camera signal process, such as γ-correction of the output data from the A/D converter, to adjust the color balance; and a capture resize circuit 16 that fetches (retrieves) output image data from the camera signal processing circuit 14 in accordance with operation of a release button 18, and resizes the image data as required.

A buffer memory 20 provisionally stores the photographed image data, and reproduction image data as well; a buffer memory control circuit 22 controls writing to and reading from the buffer memory 20; a liquid crystal display (LCD) panel 24 serves as image display means; a display control circuit 26 drives the liquid crystal display panel 24 and controls it; an image CODEC (coder and decoder) 28 encodes (compresses) the image data and decodes (expands) the image data thus encoded. A main memory 30 is formed by DRAM and other memory; a main memory control circuit 32 controls writing to and reading from the main memory 30; an image storage device 34 serves as the image storage medium, e.g., a non-volatile semiconductor memory, a magnetic disc, an optical disc, an opto-magnetic disc; a storage control circuit 36 controls writing to and reading from the image storage device 34; the portable digital camera further includes a network interface 38, a communication control circuit 40, a CPU 42 that controls the entire system, and operation buttons 44, through which various instructions are input to the CPU 42.

In this respect, the network interface 38 may be wired or arranged to be in a cordless mode.

The CPU 42 is connected with each of the aforesaid circuits through the CPU bus 46. More specifically, the CPU is connected with the camera signal processing circuit 14, the capture resize circuit 16, the display control circuit 26, the image CODEC 28, the main memory control circuit 32, the storage control device 36, and the communication control circuit 40.

Now, first, a photographing operation will be described. The A/D converter 12 converts analogue signals output from the image pickup element 10 into digital signals. Then, The camera signal processing circuit 14 executes gain adjustment, gamma correction, white balance correction, CCD filter-matrix correction, a color space converting operation, and other operations for the data which has been output from the A/D converter 12, and generates photographed image data which contains the synchronous information per unit of frame and line, respectively. The photographing parameters (exposure time and the like) and each of the correction parameters are set for the camera signal processing circuit 14 by the CPU 42 through the CPU bus 46.

The capture resize circuit 16 fetches/retrieves the image data output from the camera signal processing circuit 14, and converts the pixel density into a target space resolution (pixel numbers), and performs a filter process and other processes in order to compress/encode them using the image CODEC 28. The capture resize circuit 16 outputs to the buffer memory control circuit 22 the two kinds of photographed image data thus processed per frame unit for use in recording and thumb nail representation in accordance with the instruction signals of the image pickup timing provided by depression of the release button 18.

The buffer memory control circuit 22 provisionally stores the photographed image data from the capture resize circuit 16 in the buffer memory 20. There are three kinds of access requests to the buffer memory 20: the write request of photographed image data output from the capture resize circuit 16; the read request of displayed image data from the display control circuit 26; and the read and write request of photographed image data from the image CODEC 28. The buffer memory control circuit 22 performs intervention and ordering controls with respect to these access requests.

The display control circuit 26 drives the liquid crystal display panel 24 to display images in accordance with the display image data read out from the buffer memory 20 through the buffer memory control circuit 22. The buffer memory control circuit 22 complies with the periodic readout request of the display image data from the display control circuit 26, and supplies the photographed image data for use of recording, which have been stored in a specific region of the buffer memory 20, to the display control circuit 26.

The image CODEC 28 reads in from the buffer memory 20 the two kinds of photographed image data for use in recording and thumb nail representation, and encodes them compressively and respectively. The two kinds of encoded image data thus compression encoded by the image CODEC 28 are provisionally stored in a specific region of the main memory 30 through the CPU bus 46. The operation of the image CODEC 28 for the compression encoding is initiated immediately the moment the photographed image data begins to be stored in the buffer memory 20 or when storage to the buffer memory 20 is completed.

The main memory control circuit 32 controls the access of writing to and reading from the main memory 30. As for access requests to the main memory 30, there are the request from the image CODEC 28 as to reading and writing of the encoded image data, and access requests from the CPU 42 as to the program and data. The main memory control circuit 32 performs intervention and ordering controls of these access orders.

The CPU 42 transfers sequentially to the image storage device 34 the two kinds of encoded image data for use in recording and thumb nail representation which have been provisionally stored in the main memory 30. The storage control circuit 36 controls the writing and reading accesses for the image storage device 34. As for access requests to the image storage device 34, there are the reading and writing accesses of various data including the encoded image data provided by the CPU 42.

When the two kinds of the encoded image data are stored in the image storage device 34, the CPU 42 deletes the encoded image data obtained from the main memory 30, and then returns to the next photographing operation.

A description now will be made of the reproducing operation of the image data stored in the image storage device 34. The user designates the image that should be reproduced by use of the operation button(s) 44. Then, the CPU 42 instructs the storage control circuit 36 to read from the image storage device 34 the encoded image data of the designated image, and store the data in a specific region of the main memory 30.

The image CODEC 28 reads out the encoded image data for use in recording, which has been read out from the image storage device 34 and stored in the specific region of the main memory 30, and supplies the data to the buffer memory control circuit 22 after execution of the expansion decoding process. The buffer memory control circuit 22 stores the reproducing image data from the image CODEC 28 on a specific region of the buffer memory 20.

The display control circuit 26 reads out the reproducing image data on the buffer memory 20 periodically, as in the case of the photographed image data, and drives the liquid crystal display panel 24 in accordance with the image data, and displays images on the liquid crystal display panel 24.

Now, with reference to FIGS. 2A, 2B and FIG. 3, description will be made of the operation of image data transfer in accordance with the present embodiment. FIGS. 2A and 2B are flowcharts which show the operation thereof. It is assumed that the image data is usually transferred under the compressed condition. Here, unless otherwise specified, each of the steps shown in FIGS. 2A and 2B is executed by a program that operates on the CPU 42. Both the apparatus on the call originating side and the apparatus on the called side are structured as shown in FIG. 1. The apparatuses on the call originating side serves as the image transmission apparatus, and the apparatus on the called side serves as the image reception apparatus. When there is a need for making a distinction between the constituents of the apparatus on the call originating side and the apparatus on the called side, a reference mark 'S' is added to each constituent of the apparatus on the call originating side, and a reference mark 'R' is added to that of the apparatus on the called side.

When a user performs a specific image transmission on the apparatus on the call originating side (image transmission apparatus), the CPU 42S begins a series of an operational sequence of the image transfer. First, one or more image data (image files), which are designated by the user for transmission by use of the operation button 44S, are read out from the image storage device 34S and stored on the specific region of the main memory 30S (S1). The amount of data (the file capacity) of one or more image data thus designated for transmission are all added or the sheet number of images is added in order to calculate the sum thereof (S2). Then, an image transfer request signal is generated on the main memory, containing the sum of the image data or the sheet number of images calculated in step S2 (S3).

In order to establish a link with the apparatus on the called side (image reception apparatus), the apparatus on the call originating side actuates the communication control circuit 40S to call the apparatus on the called side by use of the network interface 38S. When the link is established with the apparatus on the called side, the image transfer request signal is transmitted to the apparatus on the called side (S4). The apparatus on the call originating side waits for the response from the apparatus on the called side (S5) after having transmitted the image transfer request signal.

The apparatus on the called side apparatus detects the call from the apparatus on the call originating side, and receives the image transfer request signal after the link has been established (S11). Then, it begins a series of the operational sequence of the transfer beginning at step S12. In other words, the apparatus on the called side calculates the free (unused) storage capacity of the image storage device 34R (or reads out the data on the sheet number of photographs that can be taken, which is controlled and managed separately), and reads out the sum of the target image data to be transferred on the basis of the image transfer request signal which has been received previously or the information of the sheet number of images, hence comparing them with each other (S12).

Figure 3:
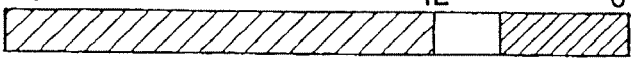
FIG. 3 is a view which shows one example of the message appearing on the called side (incoming call) apparatus (an image reception apparatus).

When the free storage capacity of the image storage device 34R is sufficient (S12), the CPU 42R displays the message and graph shown in FIG. 3 on the liquid crystal panel 24R (S13). The message "the sheet number of photographs that can be taken at present" is the value of the data on the sheet number of photographs that can be taken and stored on the image storage device 34R, and the message "the sheet number of the images to be transferred" is the sheet number of images that should be transferred from the apparatus on the call originating side. The message "the sheet number of photographs that can be taken after transfer" is the sheet number of photographs that still can be taken subsequent to having stored all the transferred images on the image storage device 34R. The CPU waits for the operation of the user (S14) after having displayed the messages and flags.

The user of the apparatus on the called side can select whether he accepts or he should refuse the transfer operation in accordance with the messages appearing on the screen shown in FIG. 3. He depresses the "YES" or "NO" instruction button, which corresponds to the desired operation accordingly (S14). The result of this operation is provided for the CPU 42R. When the "YES" button is depressed (S14), the apparatus on the called side transmits the transfer acceptance signal to the apparatus on the call originating side (S16), thus receiving the image data actually (S17 and S18). On the other hand, if the "NO" button is depressed (S14), the transfer refusal (rejection) signal is transmitted to the apparatus on the call originating side (S15).

When the apparatus on the call originating side that is awaiting a response from the apparatus on the called side receives the response (S5), a discrimination is made to determine whether the response is an acceptance or a refusal (S6). When a signal of transfer refusal is received, a message to the effect that the transfer request has been refused by the apparatus on the called side is displayed on the liquid crystal panel 24S, although not shown in FIGS. 2A and 2B in particular, hence terminating a series of the operational sequence of the transfer (S9). On the other hand, if a transfer acceptance signal is received (S6), the image data having the sheet number which has been initially designated is transmitted actually (S7, and S8). After that, the transfer operation terminates. Then, if necessary, the link with the apparatus on the called side is cut off (S9).

The apparatus on the called side receives the image data until it has reached the initially designated sheet number after transmitting the transfer acceptance signal to the apparatus on the call originating side (S17 and S18). When the image data has been received up to the initially designated transfer sheet number (S18), the transfer operation terminates, and the link with the apparatus on the call originating side is cut off (S19).

Also, the apparatus on the called side (image reception apparatus) transmits the transfer refusal signal to the apparatus on the call originating side (S15) if the free storage capacity of the image storage device 34R is insufficient (S12). Then, the apparatus on the called side terminates the transfer operation after having transmitted the transfer refusal signal, and cuts off the link with the apparatus on the call originating side (S19).

Figures 4, 4A:
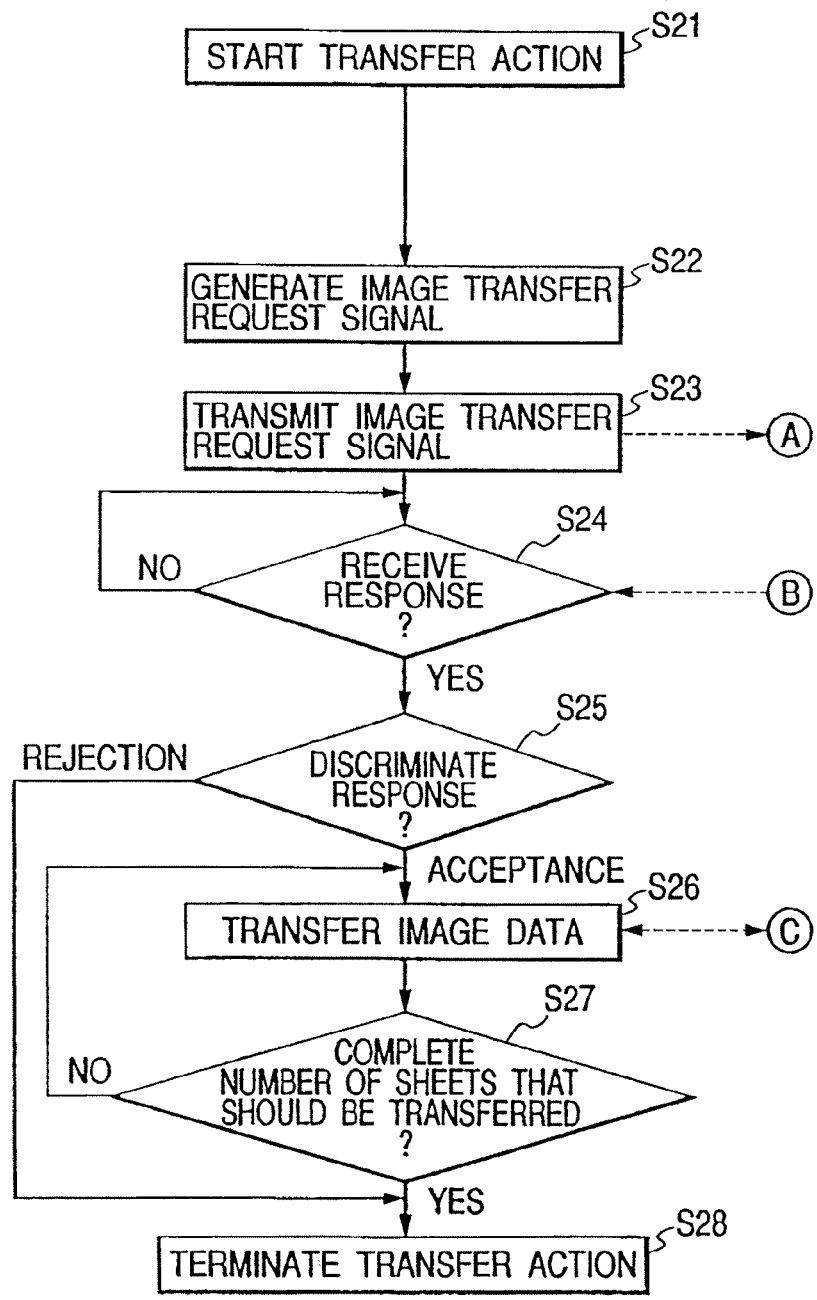
FIG. 4 is comprised of FIG. 4A and FIG. 4B showing flowcharts which show the image transfer in accordance with a second embodiment of the present invention.

FIGS. 4A and 48 are flowcharts which show another example of image transfer. When the user operates a specific image transmission on the apparatus on the call originating side (image transmission apparatus), the CPU 42S begins a series of the operational sequence of the image transfer. First, one or more image data, which are designated by the user for transmission by use of the operation button 44S, are read out from the image storage device 34S and stored on the specific region of the main memory 30S (S21). On the main memory 30S, the image transfer request signal is generated (S22), which contains the information of each identification name (file name) and each file capacity of the target image data to be transmitted (S22).

In order to establish a link with the apparatus on the called side (image reception apparatus), the apparatus on the call originating side actuates the communication control circuit 40S to call the apparatus on the called side by use of the network interface 38S. When the link is established with the apparatus on the called side, the image transfer request signal is transmitted to the apparatus on the called side (S23). The apparatus on the call originating side waits for a response from the apparatus on the called side (S24) after having transmitted the image transfer request signal.

The apparatus on the called side detects the call from the apparatus on the call originating side, and receives the image transfer request signal after the link has been established (S31). Then, it begins a series of the operational sequence of the transfer beginning at step S32. In other words, the apparatus on the called side calculates the total sheet number (or the total data amount) in accordance with each identification name (file name) of the image data contained in the image transfer request signal which has been received (S32). Then, it calculates the recordable number of sheets by the image storage device 34R (or free storage capacity thereof), hence comparing the results thereof with the total sheet number (or the total data amount) of the target image data of the image transfer request (S33).

When the free storage capacity of the image storage device 34R is sufficient (S33), the CPU 42R displays the messages and graphs shown in FIG. 3 on the liquid crystal panel 24R (S34). Then, the CPU waits for the operation of the user (S35) after having displayed the messages and flags.

The user of the apparatus on the called side can select whether he accepts or he should refuse the transfer operation in accordance with the messages appearing on the screen shown in FIG. 3. He depresses the "YES" or "NO" instruction button, which corresponds to the desired operation accordingly (S34). The result of this operation is provided for the CPU 42R. When the "YES" button is depressed (S35), the apparatus on the called side transmits the transfer acceptance signal to the apparatus on the call originating side (S37), thus receiving the image data actually (S38 and S39). On the other hand, if the "NO" button is depressed (S35), the transfer refusal signal is transmitted to the apparatus on the call originating side (S36).

Figure 4B:
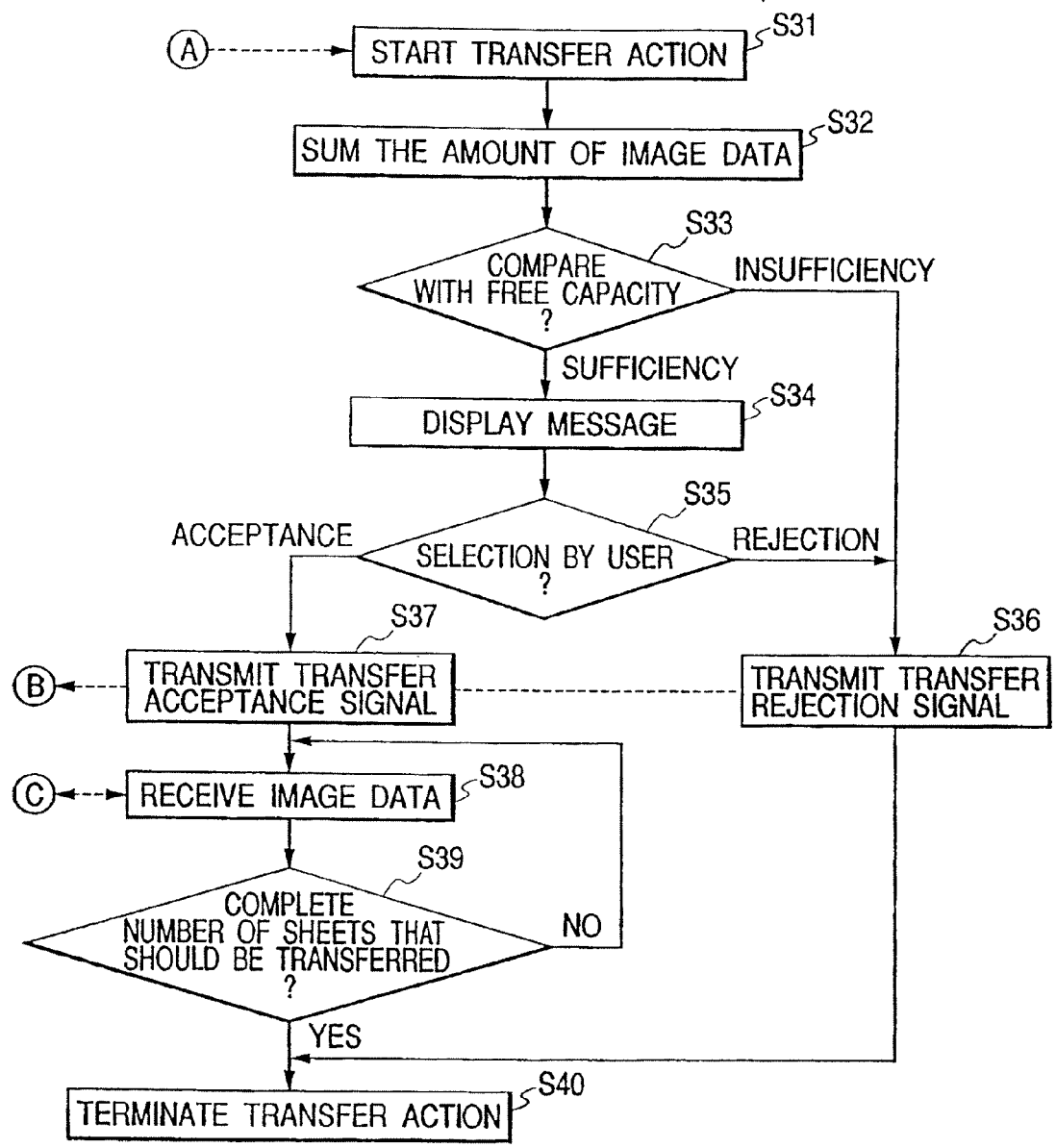

When the apparatus on the call originating side that is awaiting a response from the apparatus on the called side receives the response (S24), a discrimination is made to determine whether the response is an acceptance or a refusal (S25). When a signal of transfer refusal is received, a message to the effect that the transfer request has been refused by the apparatus on the called side is displayed on the liquid crystal panel 24S, although not shown in FIGS. 4A and 4B in particular, hence terminating a series of the operational sequence of the transfer (S28). On the other hand, if a transfer acceptance signal is received (S25), the image data having the sheet number which has been initially designated is transmitted actually (S26, and S27). After that, the transfer operation terminates. Then, if necessary, the link with the apparatus on the called side is cut off (S28).

The apparatus on the called side receives the image data until it has reached the initially designated sheet number after transmitting the transfer acceptance signal to the apparatus on the call originating side (S38 and S39). When the image data has been received up to the initially designated transfer sheet number (S39), the transfer operation terminates, and the link with the apparatus on the call originating side is cut off (S40).

Also, the apparatus on the called side (image reception apparatus) transmits the transfer refusal signal to the apparatus on the call originating side (S36) if the free storage capacity of the image storage device 34R is insufficient (S33).

The apparatus on the called side transmits the transfer refusal signal to the apparatus on the call originating side (S35). Then, it cuts off the link with the apparatus on the call originating side (S40).

Figure 6:
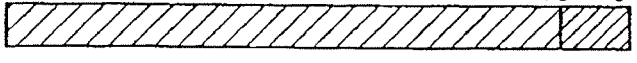
FIG. 6 is a view which shows another example of the message appearing on the called side (incoming call) apparatus (the image reception apparatus).
Figures 5, 5A:
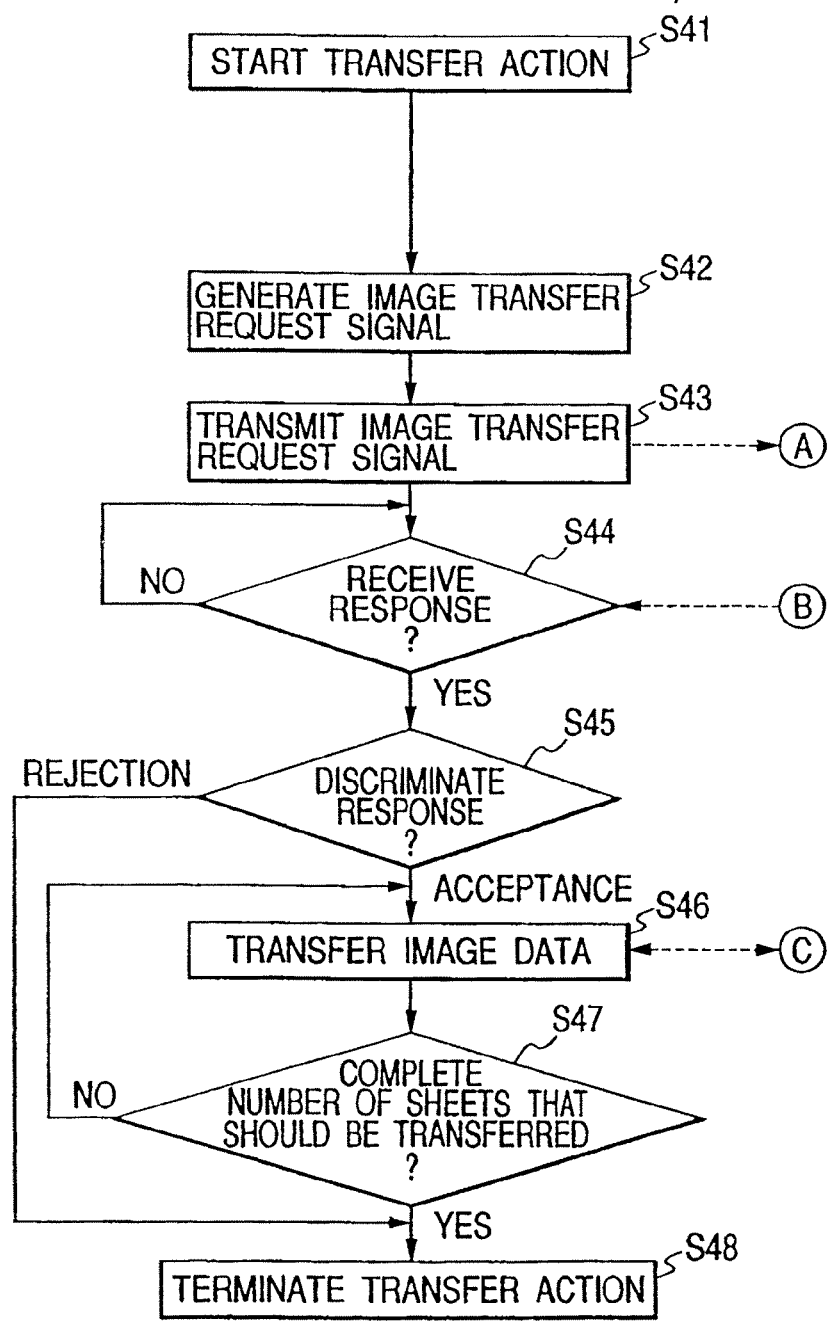
FIG. 5 is comprised of FIG. 5A and FIG. 5B showing flowcharts which show the image transfer in accordance with a third embodiment of the present invention.

FIGS. 5A and 5B are flowcharts which show an example of transfer process in accordance with a third embodiment of the present invention. FIG. 6 exemplifies the display screen of the image reception apparatus. The operation of the apparatus on the call originating side (S41 to S48) is the same as the one described in conjunction with FIGS. 4A and 4B. The operation of the apparatus on the called side is partly different from the one described in conjunction with FIGS. 4A and 4B. Therefore, description will be made mainly of the operation of the apparatus on the called side.

Now, the apparatus on the called side detects the call from the apparatus on the call originating side, and receives the image transfer request signal after the link has been established (S51). Then, it begins a series of the operational sequence of the transfer beginning at step S52. In other words, the apparatus on the called side calculates the total sheet number (or the total data amount) in accordance with each identification name (file name) of the image data contained in the image transfer request signal which has been received (S52). Then, it calculates the recordable number of sheets by the image storage device 34R (or free storage capacity thereof), hence comparing the results thereof with the total sheet number (or the total data amount) of the target image data of the image transfer request (S53).

When the free storage capacity of the image storage device 34R is sufficient (S53), the CPU 42R generates an image transfer acceptance signal which contains the information indicating that all the image data of the target transfer are receivable, and displays the messages and graphs shown in FIG. 8 on the liquid crystal panel 24R (S54). On the other hand, if the free storage capacity of the image storage device 34R is insufficient (S53), the CPU 42R generates an image transfer acceptance signal which contains information that specifies the image data of the maximum sheet number receivable within the range of the free storage capacity, and displays the messages and flags shown in FIG. 6 on the screen of the liquid crystal display panel 24R (S55). An image transfer acceptance signal is generated in accordance with the image transfer request signal transmitted from the apparatus on the call originating side, and this signal contains each identification name (file name) of each image data.

In FIG. 6, The apparatus on the called side transmits the transfer refusal signal to the apparatus on the call originating side (S35). Then, it cuts off the link with the apparatus on the call originating side (S40). The message "the sheet number of photographs that can be taken at present" is the value of the data on the sheet number of photographs that can be taken and stored on the image storage device 34R, and the message "the sheet number of the images to be transferred" is the sheet number of images that should be transferred from the apparatus on the call originating side. The message "the sheet number of photographs that can be taken after transfer" is the sheet number of photographs that still can be taken subsequent to having stored all the transferred images on the image storage device 34R. Here, where it is impossible to receive all the images, the message "the sheet number of photographs that can be taken after transfer" indicates a negative value.

After having displayed the messages and flags as shown in FIG. 3 or FIG. 6, the CPU waits for the operation of the user (S54 and S55). The user of the apparatus on the called side can select whether he accepts or he should refuse the transfer operation in accordance with the messages appearing on the screen shown in FIG. 3 or FIG. 6. He depresses the "YES" or "NO" instruction button, which corresponds to the desired operation accordingly (S56). This operation is provided for the CPU 42R. When the "YES" button is depressed (S56), the apparatus on the called side transmits the transfer acceptance signal to the apparatus on the call originating side (S58), thus receiving the image data actually (S59 and S60). On the other hand, if the "NO" button is depressed (S56), the transfer refusal signal is transmitted to the apparatus on the call originating side (S57).

When the apparatus on the call originating side that is awaiting a response from the apparatus on the called side receives the response (S44), a discrimination is made to determine whether the response is an acceptance or a refusal (S45). When a signal of transfer refusal is received, a message to the effect that the transfer request has been refused by the apparatus on the called side is displayed on the liquid crystal panel 24S, although not shown in FIGS. 5A and 5B in particular, hence terminating a series of the operational sequence of the transfer (S48). If a transfer acceptance signal is received (S45), a message to the effect that the transfer of all the image data is accepted totally, as requested, or the transfer is made partly on the screen of the liquid crystal display panel 24S. Then, the image data whose transfer has been accepted is transmitted sequentially and actually (S46 and S47). The apparatus on the called side receives the image data until it has reached the initially designated sheet number after transmitting the transfer acceptance signal to the apparatus on the call originating side (S59 and S60). When the image data has been received up to the initially designated transfer sheet number (S60), the transfer operation terminates, and the link with the apparatus on the call originating side is cut off (S61).

The apparatus on the called side transmits the transfer refusal signal to the apparatus on the call originating side. Then it cuts off the link with the apparatus on the call originating side (S61).

For the transfer process in accordance with the third embodiment described above, the CPU 42R generates an image transfer acceptance signal which contains information that specifies the maximum sheet number of the image data within the range of the free storage capacity if the free storage capacity of the image storage device 34R is insufficient (S53). The resultant sheet number of the photographs that still can be taken on the apparatus on the called side becomes "0" inevitably when the transfer operation is completed. Now, therefore, another embodiment of transfer process easily may be conceivable wherein a step is added immediately after step S55 so as to enable the user of the apparatus on the called side to designate the sheet number of the target image data for the transfer operation so that the sheet number of photographs that still can be taken after completion of the transfer operation may become "1" or more.

FIGS. 7A and 7B are flowcharts which show the example of transfer process in accordance with a fourth embodiment of the present invention. FIG. 8 to FIG. 13 are views which illustrate examples of the display screen of the image reception apparatus. The operation of the apparatus on the call originating side (S71 to S78) is the same as the one described in conjunction with FIGS. 4A and 4B. The operation of the apparatus on the called side is partly different from the one described in conjunction with FIGS. 4A and 4B. Therefore, the description herein will be made mainly of the operation of the apparatus on the called side.

Now, the apparatus on the called side detects the call from the apparatus on the call originating side, and receives the image transfer request signal after the link has been established (S81). Then, it begins a series of the operational sequence of the transfer beginning at step S82. In other words, the apparatus on the called side calculates, at first, the total sheet number (or the total data amount) in accordance with each identification name (file name) of the image data contained in the image transfer request signal which has been received (S82). Then, it calculates the number of sheets recordable by the image storage device 34R (or free storage capacity thereof), hence comparing the results thereof with the total sheet number (or the total data amount) of the target image data of the image transfer request (S83).

When the free storage capacity of the image storage device 34R is sufficient (S83), the CPU 42R generates an image transfer acceptance signal which contains the information indicating that all the image data of the target transfer are receivable, and displays the messages and graphs shown in FIG. 3 on the liquid crystal panel 24R (S84).

After having displayed the messages and flags shown in FIG. 3, the CPU waits for the operation of the user (S84). The user of the apparatus on the called side can select whether he accepts or he should refuse the transfer operation in accordance with the messages appearing on the screen shown in FIG. 3. He depresses the "YES" or "NO" instruction button, which corresponds to the desired operation accordingly (S85). This operation is provided for the CPU 42R. When the "YES" button is depressed (S85), the apparatus on the called side transmits the transfer acceptance signal to the apparatus on the call originating side (S96), thus receiving the image data actually (S98 and S99). On the other hand, if the "NO" button is depressed (S85), the transfer refusal signal is transmitted to the apparatus on the call originating side (S97).

On the other hand, if the free storage capacity of the image storage device 34R is insufficient (S83), the CPU 42R displays the messages and flags shown in FIG. 8 on the screen of the liquid crystal panel 24R in order to prompt whether the selection is made for each individual image data to be received within the range of the free storage capacity or the selection is made for the refusal of the receiving operation as a whole (S86).

In FIG. 8, the message "the sheet number of photographs that can be taken at present" is the value of the data on the sheet number of photographs that can be taken and stored on the image storage device 34R, and the message "the sheet number of the images to be transferred" is the sheet number of images that should be transferred from the apparatus on the call originating side. The message "the sheet number of photographs that can be taken after transfer" is the sheet number of photographs that still can be taken subsequent to having stored all the transferred images on the image storage device 34R. Here, it is impossible to receive all the images, so the message "the sheet number of photographs that can be taken after transfer" indicates a negative value.

After having displayed the messages and flags shown in FIG. 8, the CPU waits for the operation of the user (S86). Since the user of the apparatus on the called side can select whether he proceeds to the operation to select the target image data for the transfer operation or he refuses the transfer operation as a whole in accordance with the messages appearing on the screen shown in FIG. 8, he may depress the "YES" or "NO" instruction button, which corresponds to the desired operation accordingly (S86). This operation is provided for the CPU 42R. When the "YES" button is depressed (S87), the apparatus on the called side prompts the user to make the selection of the target image data for the transfer operation, and at the same time, displays on the screen of the liquid crystal panel 24R the list of the image data requested by the apparatus on the call originating side as the target for the transfer operation as shown in FIG. 9 (S88). On the other hand, if the "NO" button is depressed (S87), the transfer refusal signal is transmitted to the apparatus on the call originating side (S97).

In FIG. 9, the list of the image data requested by the apparatus on the call originating side as the target of the transfer operation, which is shown on the screen of the liquid crystal display panel 24R, is formed in accordance with each identification name (file name) of the image data contained in the image transfer request signal received in the S81. For the example shown in FIG. 9, the so-called scrolling display method is adopted, because the number of sheets (12) of the transmitting images thus requested is larger than the sheet number of image data (six) that can be displayed at a time within the arrangement limit of the display layout.

During operation by the user on the called side to select the transfer image data, one sheet of image data is selected, and at each time such selection is made (S89), the total sheet number (or the total data amount) is calculated for the image data selected by the user up to the present in accordance with the file capacity of the selected image data (S90). Then, the number of recordable sheets of the image storage apparatus 34R (or the free storage capacity thereof) is calculated, then comparing it with the total sheet number (or the total data amount) of the image data selected by the aforesaid user (S91).

Figure 10:
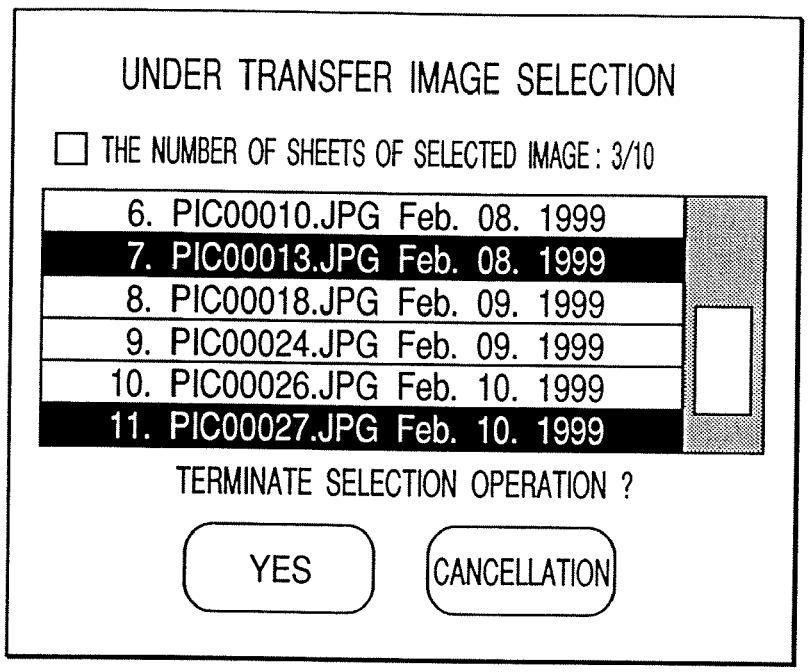
FIG. 10 is a view which shows a further example of the message appearing on the apparatus on the called (incoming call) side (the image reception apparatus).

As a result of the comparison, if the free storage capacity of the image storage device 34R is sufficient (S91), the CPU 42R updates the list of the transfer image data shown on the screen of the liquid crystal display panel 24R in order to indicate that the image data selected by the user in the step S89 has been accepted as the target of the transfer operation (S92). FIG. 10 shows the example of the list of the transfer image data which is thus updated. As shown in FIG. 10, the image data that have been selected as the target of the transfer operation are represented each in the reversed black and white indication.

Figure 11:
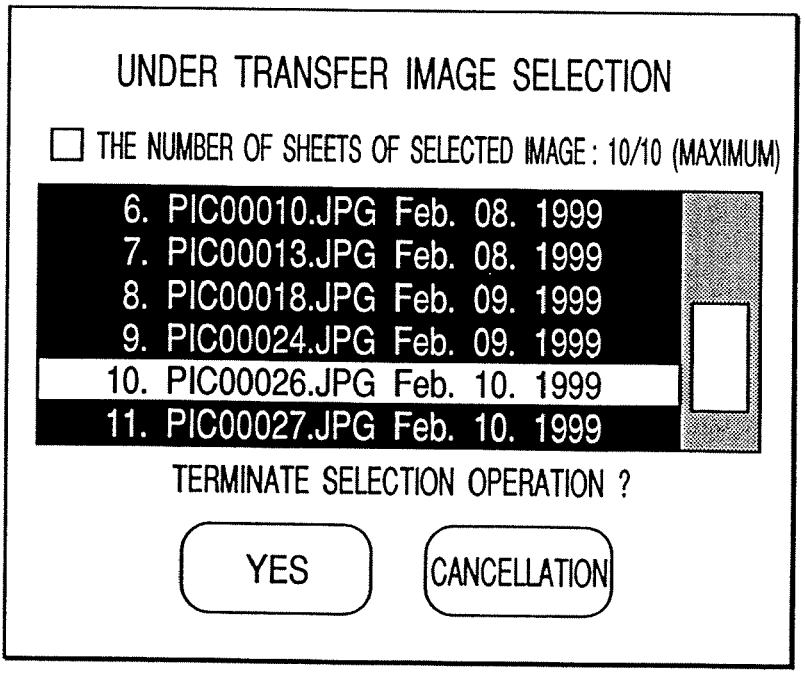
FIG. 11 is a view which shows still a further example of the message appearing on the apparatus on the called (incoming call) side (the image reception apparatus).

In a case where a free storage capacity of the image storage device 34R is found sufficient as a result of the comparison in the step S91, but such free storage capacity (image sheet number) becomes "0" or insufficient to store one sheet portion of the image data (S91) by the selection of the image data in step S89, the CPU 42R indicates that the image data selected by the user in step S89 is accepted as the target of the transfer operation, and updates the list of the transfer image data shown on the screen of the liquid crystal display panel 24R in order to show that the total sheet number of the image data which have been selected up to the present has arrived at the maximum value (S92). FIG. 11 shows an example of a list of transfer image data thus updated. As shown in FIG. 11, all the image data that have been selected up to now as the target of the transfer operation are indicated in the reversed black and white representation. Also, the sheet number of each selected transfer image, which has arrived at the maximum is indicated with the remark "10/10" or "(the maximum value)".

On the other hand, if the free storage capacity of the image storage device 34R is found insufficient as a result of the comparison in the step S91, the CPU 42R indicates that the image data selected by the user in step S89 has been accepted as the target of the transfer operation, and updates the list of the transfer image data shown on the screen of the liquid crystal display panel 24R in order to show the total sheet number of the image data which have been selected up to the present has arrived at the maximum value (S92). FIG. 12 shows an example of a list of the transfer image data thus updated. Here, with the remark "the maximum transferable number of sheets", it is indicated that the transfer sheet number of images already selected has arrived at the maximum value as shown in FIG. 12.

When a series of operations to select the transfer image data by the user on the apparatus on the called side are completed with the depression of the "YES" instruction button of the operation buttons 44R, as shown in FIG. 10 to FIG. 12 (S89), the apparatus on the called side generates the image transfer acceptance signal which contains the information indicating that only the image data selected by the user is acceptable for reception, and displays the messages and graphs shown in FIG. 13 on the liquid crystal panel 24R (S95).

In FIG. 13, the phrase "the number of sheets selected" is the sheet number of the images selected by the user on the apparatus on the called side as the target of the transfer operation in a series of the aforesaid operation of selections, and the phrase "the possible number of sheets for photographing after transfer" is the sheet number of photographs that still can be taken after having stored all the transferred images on the image storage device 34R.

Subsequent to displaying of the messages and flags shown in FIG. 13, the CPU waits for the operation of the user (S95). The user of the apparatus on the called side can select whether he accepts or he should refuse the transfer operation in accordance with the messages appearing on the screen shown in FIG. 13. He depresses the "YES" or "NO" instruction button of the operation buttons 44R, which corresponds to the desired operation accordingly (S95). This operation is provided for the CPU 42R. When the "YES" button is depressed (S95), the apparatus on the called side transmits the transfer acceptance signal to the apparatus on the call originating side (S96), thus receiving the image data actually (S98 and S99). On the other hand, if the "NO" button is depressed (S95), the transfer refusal signal is transmitted to the apparatus on the call originating side (S97).

On the other hand, if the button which corresponds to the "cancel" is depressed by the user in a series of operations to select image data (S85), the apparatus on the called side does not display the list of the image data shown in FIG. 9 on the screen of the liquid crystal display panel 24R (S88). The process returns to the initial status of the series of the operation of the user to select the image data (S89).

When the apparatus on the call originating side that has awaited a response from the apparatus on the called side receives the response (S74), a discrimination is made to determine whether the response is an acceptance or a refusal (S75). When the signal of transfer refusal is received, a message to the effect that the transfer request has been refused by the apparatus on the called side is displayed on the liquid crystal panel 24S, although not shown in FIGS. 7A and 7B in particular, hence terminating a series of the operational sequence of the transfer (S78). If the transfer acceptance signal is received (S75), a message to the effect that the transfer of all the image data is accepted totally as request or the transfer is made partly on the screen of the liquid crystal display panel 24S. Then, the image data whose transfer has been accepted is transmitted sequentially and actually (S76 and S77). The apparatus on the called side receives the image data until it has reached the initially designated sheet number after transmitting the transfer acceptance signal to the apparatus on the call originating side (S98 and S99). When the image data has been received up to the initially designated transfer sheet number (S99), the transfer operation terminates, and the link with the apparatus on the call originating side is cut off (S100).

The apparatus on the called side transmits the transfer refusal signal to the apparatus on the call originating side. Then it cuts off the link with the apparatus on the call originating side (S100).

For the transfer process of the fourth embodiment described above, only the identification name (file name) of each image data is indicated on the displayed list of the transfer image data, as shown in FIG. 9 (S88). However, it may be effective for the user of the apparatus on the called side to determine his selection if the thumb nail images are also displayed together with such indication shown on the list. This arrangement of the additional display can easily be implemented in such a manner that the apparatus on the call originating side adds to the image transfer request signal the information of the thumb nail images of each image data together with the identification name (file name) thereof (S72), and that this information of the thumb nail images is made obtainable by the apparatus on the called side when receiving the image transfer request signal (S81).

As described above, the process, in which the apparatus on the call originating side adds to the image transfer request signal the information of thumb nail images of each image together with the identification name (file name) thereof, is not necessarily limited to the transfer process in accordance with the fourth embodiment. This additional process of thumb nail image information is applicable to all the transfer processes in accordance with the first to third embodiments. In this case, the thumb nail image information of each image data requested for transfer still remains on the apparatus on the called side even when the like is cut off by the user of the apparatus on the called side due to his refusal of the transfer operation process as a whole. Therefore, this process to provide such additional information is still effective at least for the maintenance of a better communication between the users on the call originating side and called side. Further, in accordance with the transfer process of the third embodiment described above, the sheet number of the image data is selected by the user of the apparatus on the called side as the target of the transfer operation within the range of the maximum sheet number in the receivable range of the free storage capacity of the apparatus on the called side if the free storage capacity of the image storage device 34R is insufficient (S53), and also, in accordance with the transfer process of the fourth embodiment, the image data is selected by the user of the apparatus on the called side as the target of the transfer operation within the range of the maximum sheet number in the receivable range of the free storage capacity of the apparatus on the called side if the free storage capacity of the image storage device 34R is insufficient (S83). In either embodiments of the transfer process, it is easily conceivable to add the selective delete operation to the user selection steps (S56 and S87) with respect to the image data stored on the apparatus on the called side.

Also, a description has been made of examples of a connection type linkage. However, this invention is obviously applicable to a connectionless type linkage with the exception of the connection probability and the cut off process thereof.

Also, a description has been made of examples in which images are transferred between digital cameras. Fundamentally, however, it is of course possible to apply the image transfer as it is even if there are some restrictions on the image storage capacity on the image reception side.

Other Embodiments

Regarding the file name:

The file name shown in FIG. 9 may be manually input by the user of the apparatus on the call originating side through the operation button(s) 44S of the apparatus on that side.

Also, if a GPS (global positioning system) is installed on the apparatus on the call originating side, information of the position photographed by a digital camera on the apparatus on the call originating side is referenced to the map information held separately by the apparatus on the call originating side on the main memory 30, and the locational information on the map, which has been obtained as a result of such reference, may be added to the file name.

With this structure, it becomes possible for the operator of the apparatus on the called side to select the image (file) with a consideration given to the location where such image (file) has been obtained.

Also, for the apparatus on the call originating side, it may be possible to arrange the structure so that the information of priority order is added to the image (file) selected by the operator of the apparatus on the call originating side when the image (file) is selected for transmission.

In this case, the structure may be arranged to display the priority order information on the display unit of the apparatus on the called side, while linking with the file name information, as shown in FIG. 9. Then, it is made possible for the operator on the apparatus on the called side to select the file (image) with attention given to the intention of the operator of the apparatus on the call originating side in this respect.

Also, it may be possible for the apparatus on the called side to reproduce the comment (audio memorandum) concerning the file by use of an audio device with the provision of the audio input, reproduction, and audio output functions (not shown) both for the apparatuses on the call originating and called sides, while making it possible to designate the file name on the display unit shown in FIG. 9.

In this case, the operator of the apparatus on the call originating side, which is designated in advance by use of the audio input function on the apparatus on the call originating side, adds a comment (audio memorandum) to each of the files as the image transfer signal, thus making it possible to select the file while referencing such comment on each file when the selection is made, as shown in FIG. 9.

If the various pieces of information described above are added to the image (file) simultaneously, the operator finds it much easier to select the image (file) for his use.

Regarding image taking during communication, the description will be made hereinafter.

Due to the inherent characteristics of a digital camera, there is a need for the operator to photograph at a desired timing irrespective of whether the image (file) is in communication or not. Therefore, for the digital camera of the embodiments described above, the structure is arranged to enable the operator of the digital camera to photograph in a specific number of sheets by use of the main memory 30 even in the midst of a transmission of an image (file) to the apparatus on the called side or in the midst of a reception from the apparatus on the call originating side.

Then, if the operator intends to photograph to the extent that the capacity of the main memory 30 becomes insufficient on the apparatus on the call originating side or on the apparatus on the called-side, it may be possible to give a warning sound accordingly by use of the audio output function (not shown) of the digital camera so as to notify the operator that he is unable to take photographs any more.

Such notification means is not necessarily limited to an audio device. In other words, it may be possible to implement such notification means without causing any trouble to the users other than the operator of the digital camera by supporting such function on the liquid crystal display panel 24 or in the finder (not shown) of the digital camera so as to indicate the information regarding the memory capacity of the main memory 30 or display the warning message when the memory capacity becomes insufficient.

With such notification, current photographing may be suspended or it may be desired to continue photographing as a matter of course even though the current communication should be suspended.

Now, therefore, among those operation buttons 44, an operation button is installed on the digital camera of the embodiments described above to suspend communication compulsorily.

In this respect, even without any installation of such operation button, it may be possible to arrange suspending communication automatically by handling the shutter button for use of photography which is depressed in such a condition where the above-described notification is issued.

Here, of course, it should be arranged to transmit to the apparatus on the call originating side a signal indicating that the communication is suspended so as to notify the operator on that side accordingly.

Regarding the image storage device, the description will be made hereinafter.

It is of course possible to adopt a memory for use of the digital camera, such as a compact flash, as the image storage device 34 which is detachably mountable on the camera.

When the detachable memory is adopted for the image storage device, the structure should be arranged so as to display the instruction for the replacement of the detachable memory depending on the results of the free storage capacity comparison on the apparatus on the called side to decide whether or not the capacity of the image storage device 34R is insufficient.

Then, this structure makes it possible for the operator of the apparatus on the called side to receive the images which are transmitted from the apparatus on the call originating side only if he has more image storage devices 34 in hand preparatorily.

Regarding the external transmission mode, the description will be made hereinafter.

In accordance with the embodiments described above, there has been no consideration given to the images (files) which are not selected.

Here, therefore, as another embodiment, it is arranged to register on the apparatus on the called side in advance the address information of some other apparatus (a computer or a portable terminal) which is made available to the operator of the apparatus on the called side, and then, the arrangement is made so that when the response is transmitted to the apparatus on the call originating side as to the information that indicates the selected image (file), the aforesaid address information is also transmitted to the apparatus on the call originating side in order to allow the images (files) which are not selected to be transmitted from the apparatus on the call originating side to the above-described some other apparatus as required.

As a result, it is made possible for the apparatus on the call originating side to transmit the selected image (file) to the apparatus on the called side, while transmitting each of the images (files) which is not selected to the aforesaid apparatus using the address information thus provided.

In order to implement the functions of the above-described embodiments, a program is stored on a storage medium to enable each of the structures thereof to operate, and then, such stored program is read out as codes to execute processes as in the embodiments by means of a client computer and a server computer. It is then construed that such method is within the scope of the above-described embodiments, and that the storage medium having the aforesaid program stored thereon is also within the scope of the above-described embodiments.

As such storage medium, it is possible to use a floppy disc, a hard disc, an optical disc, an opto-magnetic disc, a CD-ROM, a magnetic tape, a non-volatile memory card, and a ROM, for example.

In this respect, it is not necessarily limited to the processes executed only by the program stored on the aforesaid medium individually. The execution of the processes as in the above-described embodiments, which is made operative on the OS in cooperation with some other softwares and the functions of the extended boards, is also within the scope of the above-described embodiments.

As is readily understandable from the description which has been made above, it becomes possible to transfer image data smoothly with a simple operation even when there is a limit to the capacity of image storage on the image reception side. Also, it is made possible for the image reception side to determine whether the image transfer is acceptable, and to decide on the transferable sheet number of images as well. Therefore, it is possible to prevent the image storage of the apparatus on the image reception side from being used up completely.

It is arranged for the apparatus on the image reception side to indicate the free storage capacity in advance when images are received. This indication is significantly useful at determining the acceptance or the refusal of the image transfer.

What is claimed is:

1. A digital camera comprising:
   an image pickup unit configured to convert an image of an object into an electric signal with a solid state image pickup element;
   an image data storing control unit configured to store the electric signal as image data on a storage medium;
   a transfer request receiving unit configured to receive, from another digital camera, a transfer request indicating image data to be transferred and an amount of each of the indicated image data;
   a comparing unit configured to compare a sum total of the image data amount of all of the image data indicated by the transfer request with a remaining storage capacity of the storage medium;
   a response transmitting unit configured to transmit, to the other digital camera, a response for approving transfer of all the image data indicated by the transfer request if it appears to be possible according to a comparison result of said comparing unit to store all the image data indicated by the transfer request onto the storage medium, and transmit, to the other digital camera, a response for approving transfer of image data selected by an external operation from among the image data indicated by the transfer request, if it appears to be impossible according to the comparison result to store all the image data indicated by the transfer request onto the storage medium; and
   an image data receiving unit configured to receive the image data from the other digital camera after transmitting the response.

2. A digital camera according to claim 1, further comprising a display control unit configured to display, on a display unit, an image selection screen for selecting the image data to be transferred, by the external operation, if it appears to be impossible to store all the image data indicated by the transfer request onto the storage medium.

3. A digital camera according to claim 2, further comprising an attribute information receiving unit configured to receive, before receiving the image data, attribute information of the image data to be transferred from the other digital camera.

4. A digital camera according to claim 3, wherein the attribute information includes a file name of the image data to be transferred from the other digital camera.

5. A digital camera according to claim 3, wherein the attribute information includes a thumbnail of the image data to be transferred from the other digital camera.

6. A digital camera according to claim 3, wherein the attribute information includes audio data related to the image data to be transferred from the other digital camera.

7. A control method of a digital camera comprising an image pickup unit configured to convert an image of an object into an electric signal with a solid state image pickup element, an image data storing unit configured to store the electric signal as image data on a storage medium, and a communication unit configured to communicate with another digital camera, said control method comprising:

receiving a transfer request from the other digital camera, the transfer request indicating image data to be transferred and an amount of each of the indicated image data;

comparing a sum total of the image data amount of all of the image data indicated by the transfer request with a remaining storage capacity of the storage medium;

transmitting, to the other digital camera, a response for approving transfer of all the image data indicated by the transfer request if it appears to be possible according to a comparison result of said comparing step to store all the image data indicated by the transfer request onto the storage medium, and transmitting, to the other digital camera, a response for approving transfer of image data selected by an external operation from among the image data indicated by the transfer request, if it appears to be impossible according to the comparison result to store all the image data indicated by the transfer request onto the storage medium; and receiving the image data from the other digital camera after transmitting the response.

8. A computer-readable recording medium for recording a control program to be installed in a digital camera comprising an image pickup unit configured to convert an image of an object into an electric signal with a solid state image pickup element, an image data storing unit configured to store the electric signal as image data on a storage medium, and a communication unit configured to communicate with another digital camera, said control program comprising:

receiving a transfer request from the other digital camera, the transfer request indicating image data to be transferred and an amount of each of the indicated image data;

comparing a sum total of the image data amount of all of the image data indicated by the transfer request with a remaining storage capacity of the storage medium;

transmitting, to the other digital camera, a response for approving transfer of all the image data indicated by the transfer request if it appears to be possible according to a comparison result of said comparing step to store all the image data indicated by the transfer request onto the storage medium, and transmitting, to the other digital camera, a response for approving transfer of image data selected by an external operation from among the image data indicated by the transfer request, if it appears to be impossible according to the comparison result to store all the image data indicated by the transfer request onto the storage medium; and receiving the image data from the other digital camera after transmitting the response.

* * * * *